Mar. 20, 1923.
C. B. GINN.
STERILIZER AND SEED DRIER.
FILED MAR. 24, 1922.
1,449,280.
2 SHEETS—SHEET 1.
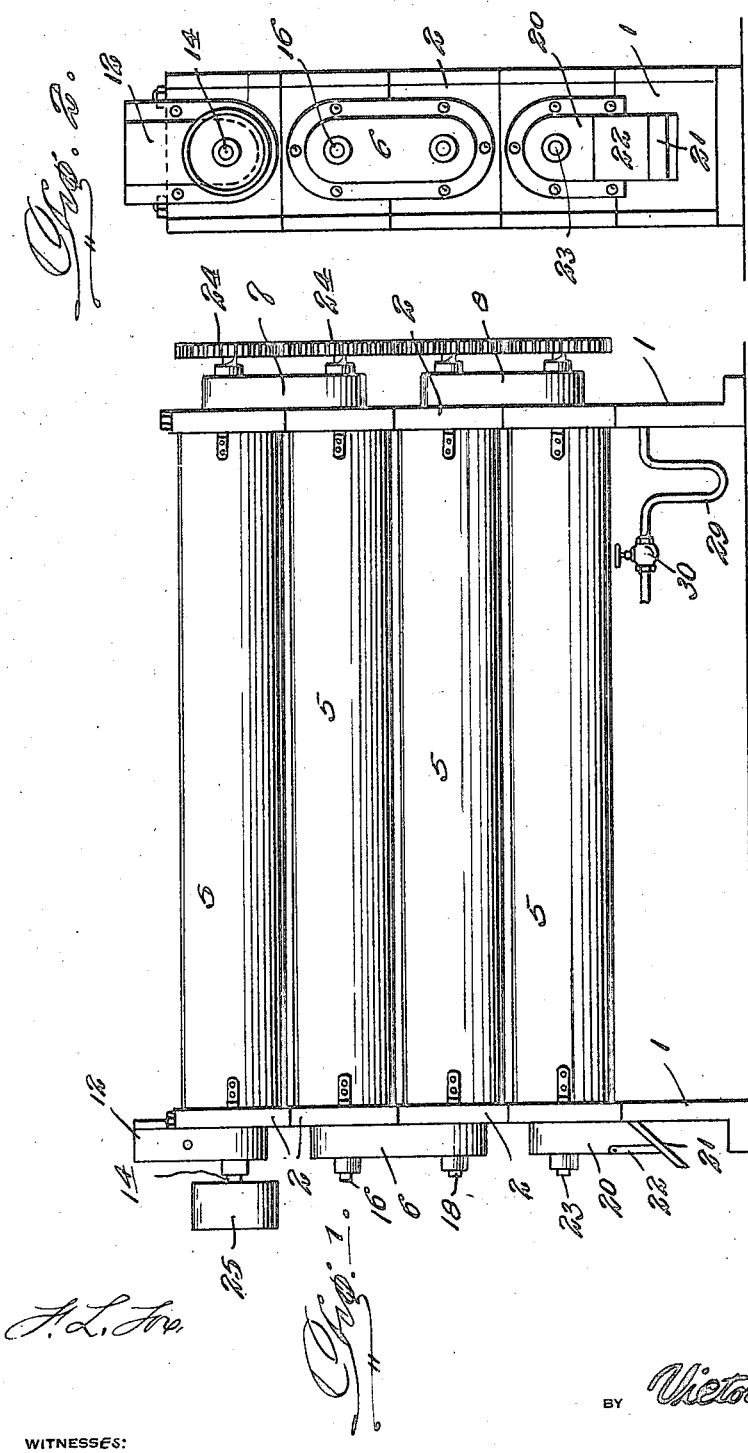
C. B. Ginn,
INVENTOR
BY Victor J. Evans.
ATTORNEY
WITNESSES:

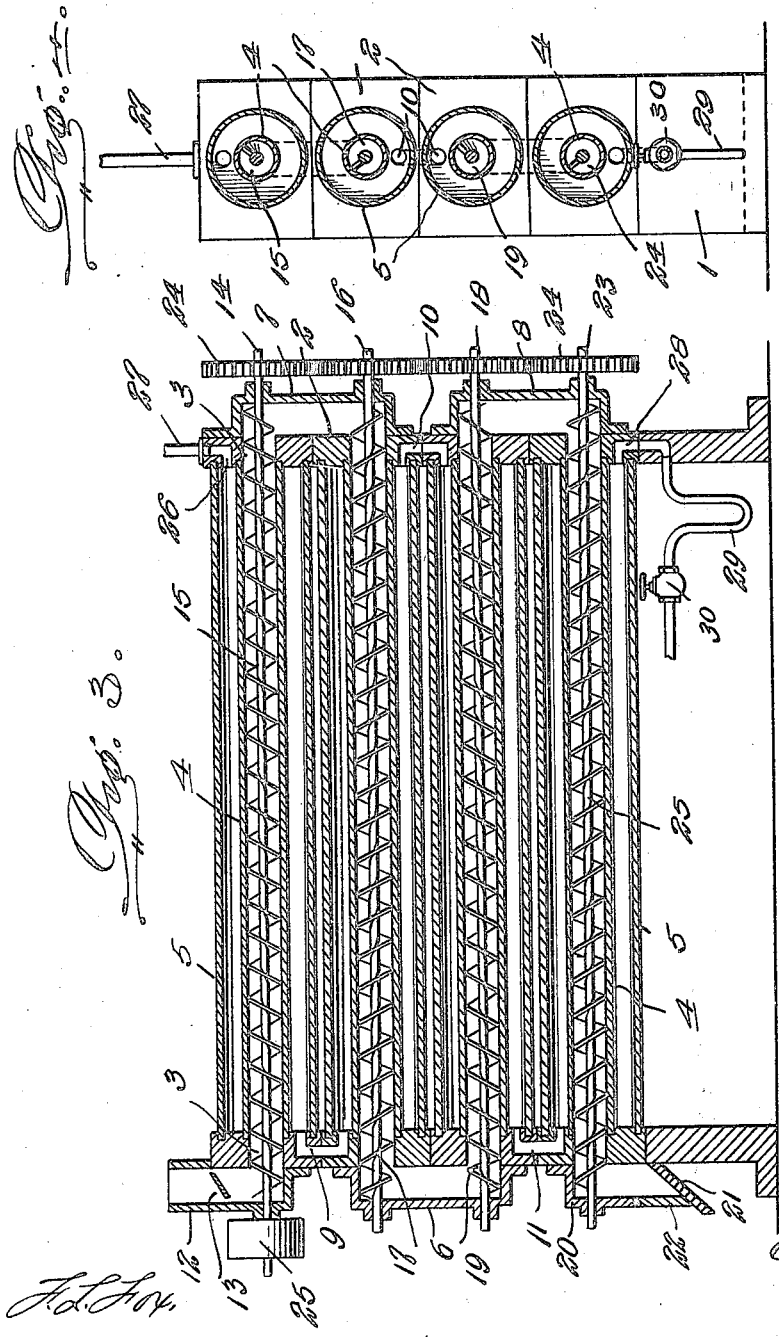

Patented Mar. 20, 1923.

1,449,280

UNITED STATES PATENT OFFICE.

CARRELLVERNON B. GINN, OF BRENHAM, TEXAS.

STERILIZER AND SEED DRIER.

Application filed March 24, 1922. Serial No. 546,533.

*To all whom it may concern:*

Be it known that I, CARRELLVERNON B. GINN, a citizen of the United States, residing at Brenham, in the county of Washington and State of Texas, have invented a new and useful Improvements in Sterilizers and Seed Driers, of which the following is a specification.

My present invention has reference to a seed sterilizer and drier.

My object is to produce an apparatus which will sterilize and dry seed in an easy, expeditious and thoroughly efficient manner.

A further object is to produce an apparatus for this purpose in which seed is fed through a plurality of superimposed tubes in a zig zag manner, said tubes being surrounded by steam chests so that the grain passing therethrough will be subjected to the heat from the steam and thereby sterilized and dried.

A further object is to produce an apparatus for sterilizing and drying seed which comprises a plurality of superimposed tubes arranged in pairs which communicate with each other at opposed ends, one of the outer tubes being provided with a valved hopper through which the seed is fed, the other tube having at its outlet end a chute normally closed by a gravity influenced gate, while revoluble in all of the tubes are screw propellers, means being provided for simultaneously imparting motion to all of the propellers, and all of the tubes being encased, while means being provided for continuously admitting steam through the casings to heat the tubes and likewise heat the grain that passes through the tubes.

The foregoing, and other objects which will present themselves as the nature of the invention is better understood, may be accomplished by a construction, combination and operative association of parts, such as is disclosed by the drawings which accompany and which form part of this specification.

In the drawings:—

Figure 1 is a side elevation of the improvement.

Figure 2 is an end view thereof.

Figure 3 is an approximately central vertical longitudinal sectional view through the improvement.

Figure 4 is an approximately transverse central sectional view therethrough.

The standards, constituting the ends of the improvement are preferably formed of a plurality of superimposed castings. As all of the castings, except the legs 1 on which the said castings are supported are of a substantially similar construction, the same are broadly indicated in the drawings by the numeral 2. The castings are each centrally provided with a round opening 3, the inner walls of the said castings being reamed or depressed around the said openings to provide pockets for the ends of tubes 4 that form the body or shell of conveyors. The castings 2 are further provided, on their confronting faces with round depressions within which are received the ends of tubular casings 5 respectively. Preferably the tubes 4 and the cylindrical casings 5 are threaded in the castings, so that the ends or standards provided by the legs 1 and the castings 2 are sustained properly related, but, if desired, other means may be employed for accomplishing this purpose. The castings 2 are connected together by hollow head members. By reference to the drawings, it will be noted that one hollow head member, indicated by the numeral 6 connects the intermediate or inner heads 2 at one end of the device, and that the inner and outer castings are connected by two head members 7 and 8 at the opposite end of the device.

For distinction, the end of the device to which the head 6 is attached will be hereinafter referred to as the front end thereof. The upper and the next intermediate block at the front of the device have communicating ports 9 which provide a passage between the upper and the next upper casing 5. The head 6 provides a communication between the intermediate tubes 4, the head 7 likewise providing a communication between the uppermost tube 4 and the tube adjacent thereto. A port 10 is provided in the confronting ends of the intermediate casting to provide a communication between the intermediate cylinders at the rear of the device, the lower and next uppermost cylinder communicating with each other through a port 11 between the lower and next uppermost casting 2 at the front of the device, while the head 8 provides a communicating passage between the lowermost tube 4 and the upper tube adjacent thereto. In this manner it will be seen that the ports communicating between the tubes between the cylinders are arranged in staggered relation with respect to each other. Secured at the front of the uppermost casting 2 there is a vertically disposed hopper 12 having an angle branch which communicates with the uppermost tube 4. The passage through the hopper is controlled by a valve 13. Journaled in suitable bearing openings in the hopper and in the head 7 there is a shaft 14. On this shaft there is a screw 15 which extends entirely through the uppermost tube 4, and also enters the hopper and the head 7. The heads 6 and 7 have bearing openings for a shaft 16 on which there is a screw 17 that extends entirely through the second tube from the top and enters the said heads 6 and 7. The head 6 and the head 8 have bearing openings for a shaft 18 provided with a screw 19 which extends entirely through the tube next to the bottom and which enters the said heads 6 and 7.

Connected to the front leg 1 and to the casting 2 supported thereon there is a box-like chute 20. The lower wall of the chute is disposed at a downward inclination and is indicated by the numeral 21. The chute is provided with an outlet opening which, however, is normally closed by a hinged gravity influenced door 22. The chute and the casting 8 have bearing openings for a shaft 23. On this shaft there is a screw 24 which extends entirely through the lowermost tube 4 and enters the chute and the head 8. On the shafts 14, 16, 18 and 23 there are meshing gears 25 respectively, while on the shaft 14, outward of the hopper 12 there is secured a pulley 25 around which a belt (not shown) is trained, said belt being connected to a suitable source of power (not shown). By reference to Figure 3 of the drawings, it will be seen that the blades of the respective screws are oppositely pitched so that grain delivered through the hopper into the uppermost chute will be forced therethrough and find a passage through the head 7 into the next uppermost tube. The screw 17 in its tube will force the grain toward the front of the device, causing the said grain to gravitate through the head 6 into the tube provided with the screw 19. The screw 19 will force the grain rearwardly through the head into the lowermost tube and the said grain is projected through the tube by the screw 24, the latter delivering the grain into the chute where the same finds an outlet through the opening that is closed by the door 22. The weight of the grain influences the door to open position.

The uppermost casting at the rear of the device is provided with a port 26 in which is screwed a steam inlet pipe 27. Steam is obtained from any suitable source of power (not shown), the said steam entering the uppermost cylindrical casing 4, and will find a passage through the port 9 to the next lower casing, and from thence through the port 10 to the next lower casing, and from thence through the port 11 to the lowermost casing. The rear leg and the casting 2 that rests thereon have an outlet port 28 therethrough. To this port there is secured a pipe provided with a trap 29. The outlet pipe for the trap has its passage controlled by a valve 30. The water condensed from the steam will at all times fill the trap 29 so that a continuous flow of steam may be let into the cylindrical casings 5 and the said steam retained in a comparatively dry state. The steam in the casings will heat the tubes 4, and such heat will be imparted to the grain that travels through the tubes, with the result that the grain, when finding an outlet through the chute 20 will be thoroughly sterilized and dried.

Having described the invention, I claim:—

1. In a device for sterilizing and drying seed, a plurality of superimposed casings having communicating ports at their adjacent ends, a tube centrally arranged in each of the casings, hollow heads providing communications between the opposed ends of the tubes, a worm in each tube, means for simultaneously imparting motion to all of the worms, means for admitting grain to one of the outermost tubes, an outlet chute for the second outermost tube, and means for admitting steam under pressure to all of the casings.

2. In a device for sterilizing and drying seed, a plurality of vertically arranged superimposed casings having communicating ports at their diagonally opposed ends, a cylinder disposed centrally in each casing, hollow diagonally disposed heads for the cylinders providing staggered communications therebetween, oppositely pitched worms in the respective tubes, means for simultaneously imparting motion thereto, a valved inlet hopper for one of the end tubes, a valved outlet chute for the other end tube, means admitting steam under pressure into one of the end casings, the second end casing having a steam outlet, and a valved trap connected to the outlet.

In testimony whereof I affix my signature.

CARRELL VERNON B. GINN.